(12) United States Patent
Wang et al.

(10) Patent No.: US 9,124,819 B2
(45) Date of Patent: Sep. 1, 2015

(54) WATERMARK AND MANUFACTURING METHOD THEREFOR

(71) Applicant: National Taiwan Normal University, Taipei (TW)

(72) Inventors: Hsi-Chun Wang, Taipei (TW); Ya-Wen Cheng, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 14/082,897

(22) Filed: Nov. 18, 2013

(65) Prior Publication Data
US 2014/0362414 A1 Dec. 11, 2014

(30) Foreign Application Priority Data
Jun. 6, 2013 (TW) .............................. 102120135 A

(51) Int. Cl.
*H04N 1/40* (2006.01)
*H04N 1/405* (2006.01)
*G06K 15/00* (2006.01)
*H04N 1/32* (2006.01)
*H04N 1/00* (2006.01)

(52) U.S. Cl.
CPC ....... *H04N 1/32256* (2013.01); *H04N 1/32154* (2013.01); *H04N 1/32203* (2013.01); *H04N 1/32208* (2013.01); *H04N 1/32219* (2013.01); *H04N 1/32299* (2013.01); *G06T 2201/0051* (2013.01); *G06T 2201/0052* (2013.01); *H04N 1/00883* (2013.01); *H04N 1/4051* (2013.01); *H04N 1/4052* (2013.01); *H04N 1/4053* (2013.01); *H04N 1/4055* (2013.01); *H04N 1/4056* (2013.01); *H04N 1/4057* (2013.01); *H04N 1/4058* (2013.01); *H04N 2201/3233* (2013.01)

(58) Field of Classification Search
USPC ...................... 358/3.03–3.05, 3.06–3.2, 3.28, 358/533–536; 382/100
See application file for complete search history.

(56) References Cited

U.S. PATENT DOCUMENTS

| | | | | | |
|---|---|---|---|---|---|
| 5,166,809 | A | * | 11/1992 | Surbrook | 358/1.9 |
| 5,171,040 | A | * | 12/1992 | Orndorff | 283/93 |
| 5,790,703 | A | * | 8/1998 | Wang | 358/3.28 |
| 5,892,588 | A | * | 4/1999 | Samworth | 358/3.19 |
| 5,953,988 | A | * | 9/1999 | Vinck | 101/129 |
| 5,954,368 | A | * | 9/1999 | Mowry, Jr. | 283/93 |

(Continued)

FOREIGN PATENT DOCUMENTS

| | | |
|---|---|---|
| TW | 201015444 A | 4/2010 |
| TW | 201322174 A | 6/2013 |
| WO | 0171960 A1 | 9/2001 |

*Primary Examiner* — Richard Zhu
(74) *Attorney, Agent, or Firm* — Lowe Hauptman & Ham, LLP

(57) ABSTRACT

A watermark and a manufacturing method therefor are provided. The watermark has a first region comprising amplitude modulation (AM) halftone dots and a second region comprising frequency modulation (FM) halftone dots, and each of the amplitude modulation halftone dots has ink portions and blank portions, each of which is located between the two ink portions in the same amplitude modulation halftone dot. The ink area percentage of the amplitude modulation halftone dots are dispersed by filling the blank portions into each of the amplitude modulation halftone dots, so that the density calibration of the amplitude modulation halftone dots and frequency modulation halftone dots can be omitted.

6 Claims, 7 Drawing Sheets

(56) References Cited

U.S. PATENT DOCUMENTS

| | | | |
|---|---|---|---|
| 6,000,728 A * | 12/1999 | Mowry, Jr. | 283/93 |
| 6,118,935 A * | 9/2000 | Samworth | 358/1.9 |
| 6,970,273 B1 * | 11/2005 | Inoue | 358/3.02 |
| 7,307,761 B2 * | 12/2007 | Man | 358/3.28 |
| 7,554,699 B2 * | 6/2009 | Wang et al. | 358/3.28 |
| 2004/0136034 A1 * | 7/2004 | Curry | 358/3.12 |
| 2004/0177782 A1 * | 9/2004 | McCrea et al. | 101/453 |
| 2005/0094844 A1 * | 5/2005 | Damera-Venkata | 382/100 |
| 2006/0170974 A1 * | 8/2006 | Wang et al. | 358/3.06 |
| 2006/0284411 A1 * | 12/2006 | Wu | 283/93 |
| 2009/0031134 A1 | 1/2009 | Levy | |

\* cited by examiner

WATERMARK AND MANUFACTURING METHOD THEREFOR

CROSS REFERENCE TO RELATED APPLICATIONS

This application claims the priority of Taiwan Patent Application No. 102120135, filed on Jun. 6, 2013, the disclosure of which is incorporated herein by reference.

FIELD OF THE INVENTION

The present invention relates to a watermark and a manufacturing method therefor, particularly relating to a watermark formed by amplitude modulation halftone dot sets and frequency modulation halftone dots and a manufacturing method therefor.

BACKGROUND OF THE INVENTION

With the advance of science and technology, a copier can produce high-quality replicas by using an equipment of photocopy, e.g. printer or scanner, which already can precisely copy documents.

Recently, issues of copyright and brand protection are getting more attention gradually after documents and books are copied illegally and frequently from time to time. The anti-counterfeiting technologies used on documents are produced continuingly, for instance, the watermark, the gravure, the infrared ink, micro prints, windowed security thread and so on. However, the above-mentioned anti-counterfeiting technologies need special equipments and/or materials, and thus are costly. As a result, it will cause limitation to widely use these anti-counterfeiting technologies for protecting common publication of books and security documents.

In these anti-counterfeiting technologies, a digital watermark with hybrid halftone dots can provide the anti-counterfeiting capability without using the special equipment and/or materials. The technology mixes the amplitude modulation (AM) halftone dots with the frequency modulation (FM) halftone dots to produce a shadow pattern of watermark, wherein matching parameters therebetween are found by making a density-calibration chart (i.e. density matching table) to adjust the distribution density of the AM halftone dots and the FM halftone dots, and the watermark is finally printed on the paper. The watermark can appear to provide the anti-counterfeiting effect after the paper is copied or scanned.

For example, referring now to FIGS. 1 and 2, a watermark 1 providing hybrid halftone dots is illustrated. As shown, the watermark 1 comprises a plurality of AM halftone dots 11 and FM halftone dots 12, wherein the AM halftone dots 11 and FM halftone dots 12 provide different dot gains due to varied microstructure of halftone dots. The hidden effect of the watermark 1 is thus affected by the different dot gains. To ensure the hidden quality of the watermark 1, the distribution density of the AM halftone dots and the FM halftone dots must be adjusted according to density-calibration chart when mixing the AM halftone dots with the FM halftone dots. Otherwise, the distribution density of the halftone dots is unstable in the process because the dot gain of the AM halftone dots and the FM halftone dots are inconsistent. Thus, it needs careful adjustment to control the hidden quality of the watermark 1.

SUMMARY OF THE INVENTION

A primary object of the present invention is to provide a watermark and a manufacturing method for a watermark, which are used to disperse the ink concentration of amplitude modulation halftone dot sets by filling the blank portions into each of the amplitude modulation halftone dot sets that has the adjacent ink portions within the same AM halftone dot set, so that the dot gain of the amplitude modulation halftone dot sets and the frequency modulation halftone dot sets can be balanced.

A secondary object of the present invention is to provide a watermark and a manufacturing method for a watermark, which are used to disperse the ink concentration of amplitude modulation halftone dot sets by filling blank portions into each of the amplitude modulation halftone dot sets that has the adjacent ink portions within the same AM halftone dot set, so that the density calibration of the amplitude modulation halftone dot sets and the frequency modulation halftone dot sets can be omitted.

To achieve the above object, the present invention provides a manufacturing method for a watermark, which comprises steps of: providing a plurality of AM (amplitude modulations) halftone dot sets equidistantly spaced apart from each other to form a first region of a personalized pattern, wherein at least one of the AM halftone dot sets has a plurality of adjacent ink portions within the same AM halftone dot set; filling a plurality of blank portions for each of the AM halftone dot sets that has the adjacent ink portions within the same AM halftone dot set, wherein an equidistant blank portion is filled between two of the adjacent ink portions to make the ink portions be equidistantly spaced apart from each other and have an interval within the same AM halftone dot set smaller than an interval between any two of the adjacent AM halftone dot sets; providing a plurality of FM (frequency modulations) halftone dots to form a second region of the personalized pattern; and printing the personalized pattern onto a paper by digital halftoning technique to form a watermark pattern that can appear after being copied.

In one embodiment of the present invention, the first region is at least one pattern area of the personalized pattern, and the second region is at least one background area of the personalized pattern.

In one embodiment of the present invention, an inking area percentage of the first region is 2% to 8%.

In one embodiment of the present invention, an inking area percentage of the second region is 2% to 8%.

In one embodiment of the present invention, an inking area percentage of the first region is the same as an inking area percentage of the second region.

In one embodiment of the present invention, an interval between any two of the adjacent ink portions are the same in each of the amplitude modulation halftone dot sets.

As described above, according to the watermark and the manufacturing method of the present invention, the ink portion of amplitude modulation halftone dot sets are dispersed by filling the blank portions into each of the amplitude modulation halftone dot sets, so that the dot gain of the amplitude modulation halftone dot sets and the frequency modulation halftone dots can be balanced, and thus the density calibration of the amplitude modulation halftone dot sets and the frequency modulation halftone dots can be omitted.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

The present invention provides a manufacturing method for a watermark, wherein a personalized pattern is designed on a paper (i.e. an original document or a manuscript) by the watermark with hybrid halftone dots of the amplitude modulation (AM) halftone dot sets and the frequency modulation (FM) halftone dots, and the personalized pattern is printed onto the paper to be a the watermark-including pattern, wherein after the personalized pattern is copied onto a copied paper, a watermark that hides in the original paper can appear so that the watermark can be displayed to show the copyright, in order to prevent the illegal copy.

Figure 1:
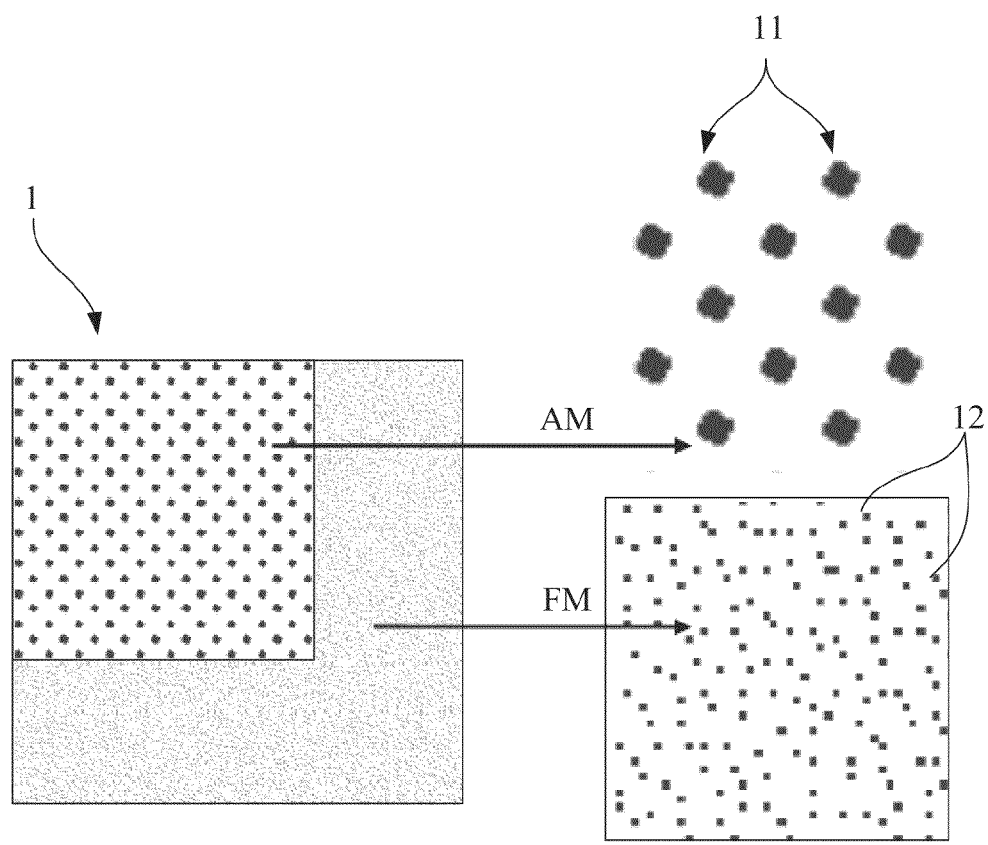
FIG. 1 is a schematic view of a traditional watermark having hybrid halftone dots.
Figure 2:
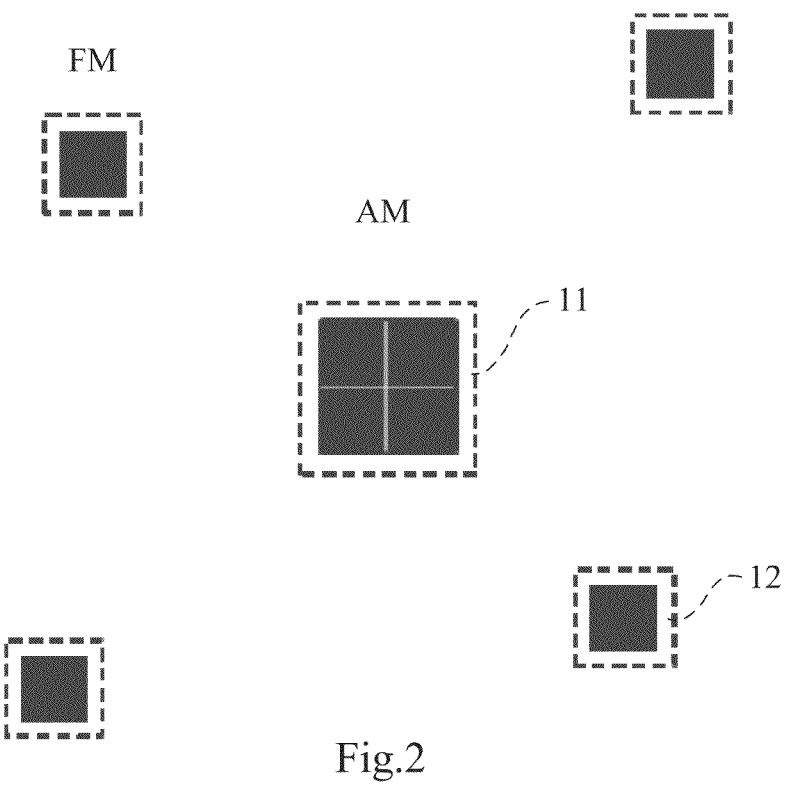
FIG. 2 is a schematic view of microstructures of amplitude modulation halftone dots and frequency modulation halftone dots in FIG. 1.
Figure 3:
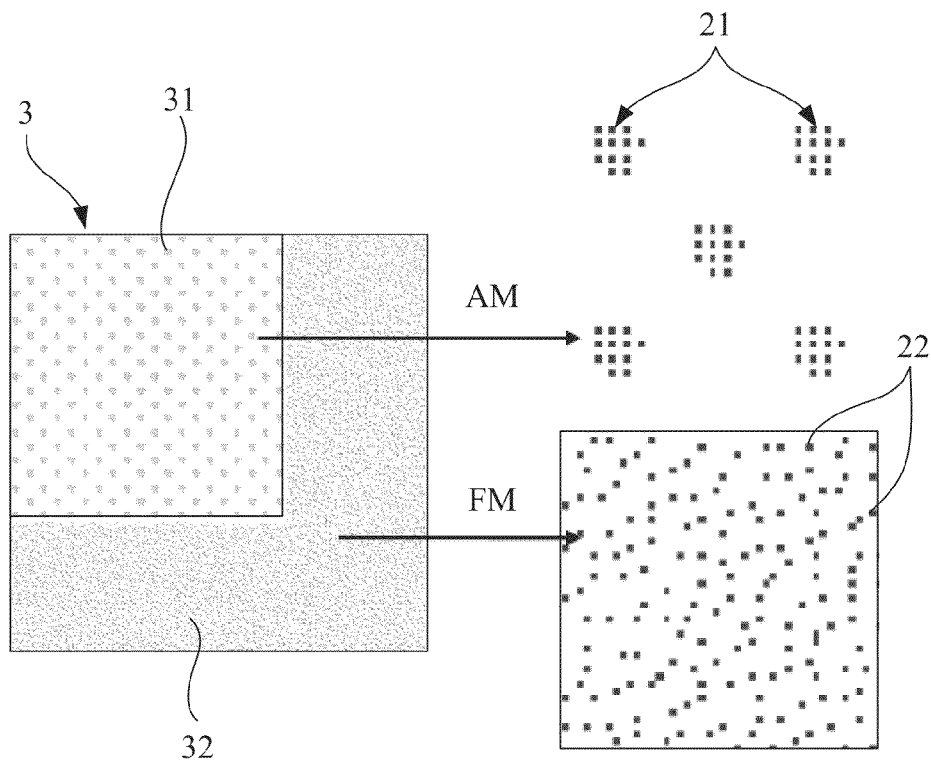
FIG. 3 is a schematic view of the watermark pattern according to the preferred embodiment of the present invention.
Figure 4:
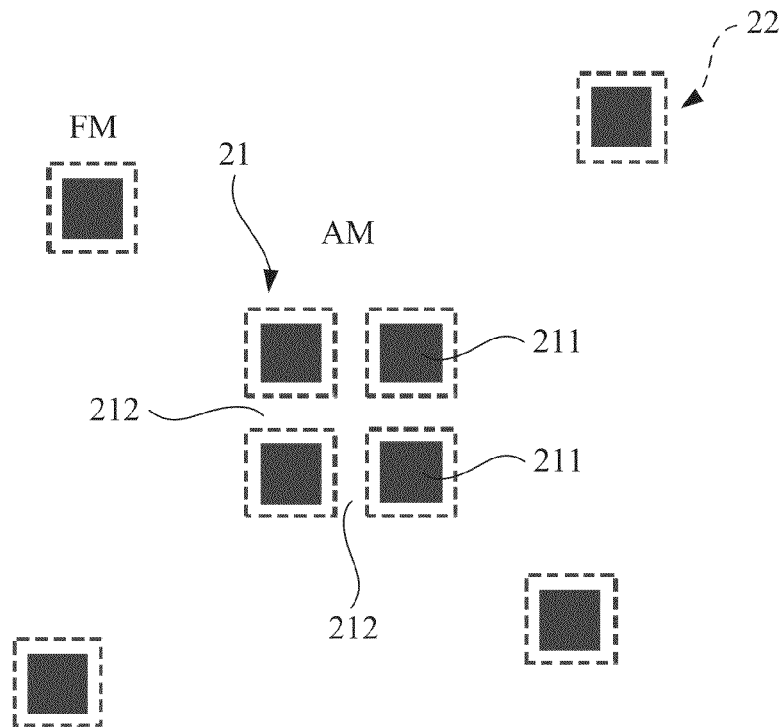
FIG. 4 is a schematic view of microstructures of amplitude modulation halftone dot sets and frequency modulation halftone dots in FIG. 3.

Referring to FIGS. 3 and 4, in one embodiment of the present invention, the present invention provides a manufacturing method for a watermark, which comprises steps of: providing amplitude modulation halftone dot sets 21 to form a first region 31 of a personalized pattern 3, wherein each of the amplitude modulation halftone dot sets 21 has ink portions 211 and blank portions 212, and each of the blank portions 212 are located between two of the adjacent ink portions 211 in the same amplitude modulation halftone dot set 21 (shown in FIG. 4); providing frequency modulation halftone dots 22 to form a second region 32 of the personalized pattern 3; and printing the personalized pattern 3 onto a paper (shown in FIG. 12) by digital halftoning technique to form a watermark pattern (shown in FIG. 13) that can appear after being copied. The present invention will be described in details below, including each of the above steps and the principle of the implementation details.

According to the embodiment of the present invention, the manufacturing method firstly provides the personalized pattern 3, wherein the personalized pattern 3 on the original paper comprises the first region 31 and the second region 32. In the embodiment, the first region 31 is at least one pattern area of the personalized pattern, and the second region 32 is at least one background area of the personalized pattern. An inking area percentage of the first region 31 is the same as an inking area percentage of the second region 32. For instance, the inking area percentage of the first region is from 2% to 8%, and the inking area percentage of the second region is from 2% to 8%.

In the process of the digital halftoning technique, the personalized pattern 3 is distinguished into two areas, one is the first region 31 comprising the amplitude modulation (AM) halftone dot sets 21, and the other is the second region 32 comprising the frequency modulation (FM) halftone dots 22, wherein the first region 31 and the second region 32 are integrated and printed onto the paper. The digital halftoning techniques, the amplitude modulation (AM) halftone dot sets 21, and the frequency modulation (FM) halftone dots 22 will be described below.

The digital halftoning technique comprises two major categories, one is ordered dithering, and the other is error diffusion. The AM halftone dot sets 21 are mainly formed by ordered dithering, and the FM halftone dots 22 are mainly formed by error diffusion.

The algorithm principle of the ordered dithering is compared a continuous-tone original image with a threshold matrix value, thereby defining each of the pixels by value of 0 (white, not inked) or 1 (black, inked). Firstly, the pattern is segmented into blocks each having a size the same as that of the threshold matrix. Because value arrangements designed in the threshold matrix are different, it can produce pattern of different dots structures. A digital printing equipment is guided to ink by the ordered dithering. Specifically, the blocks of the pattern are processed by halftoning technique, wherein the resultant binary image is generated by the following calculation: the value of the original gray image $g(i, j)$ is transformed into the tone value $g'(i, j)$ of the threshold matrix by the equation (1), wherein the length of the threshold matrix is $N_1$, and the width of the threshold matrix is $N_2$.

$$g'(i, j) = N_1 \times N_2 \times \left(1 - \frac{g(i, j)}{255}\right) \quad (1)$$

After the tone value $g'(i, j)$ is obtained, comparing the equation (2) with the threshold matrix $t(m, n)$, and thus defining the pixels by value of 0 (white, not inked) or 1 (black, inked).

$$b(i, j) = \begin{cases} 1 & g'(i, j) \geq t(m, n) \\ 0 & g'(i, j) < t(m, n) \end{cases} \quad (2)$$

For example, if the tone value of the block is 29 and the size of the block is an 8.times.8 pixels, the digital printing equipment is guided to ink by the value of the threshold, wherein the result is 29 pixels inked within the block of 64 pixels. According to the present invention, the blank portions 212 are further filled in each of the AM halftone dot sets 21 on the basis of the AM halftone dot sets 21, and thus the ink portions 211 can be arranged independently, wherein an interval between any two of the adjacent ink portions 211 are the same in each of the AM halftone dot sets 21.

In addition, the error diffusion is disclosed by Robert W. Floyd and Louis Steinberg. Errors of the pattern caused in the binarization process are diffused and spread from an error of the top left corner to neighboring pixels that are still not processed by the binarization process, wherein other pixels which absorbs errors and are still not processed by the binarization process continue to be processed to diffuse the errors until reaching the last pixel, wherein the algorithm is shown in the equation (3), the gray value of the original pixel is X, the bi-level value b is produced by comparing the X with threshold value T, the mask of the error diffusion is shown in the equation (4).

$$b(i, j) = \begin{cases} 1 & X(i, j) \geq T \\ 0 & X(i, j) < T \end{cases} \quad (3)$$

$$\frac{1}{16}\begin{bmatrix} 0 & 0 & 0 \\ 0 & -16 & 7 \\ 3 & 5 & 1 \end{bmatrix} \quad (4)$$

Figure 5:
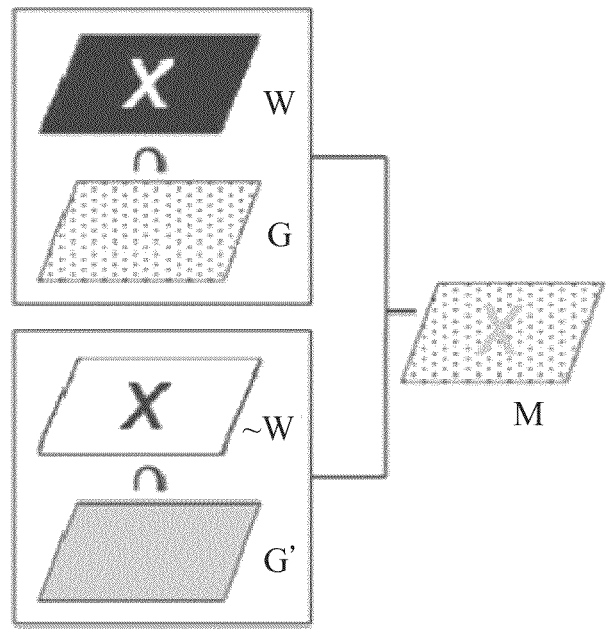
FIG. 5 is a schematic view which shows the manufacture process of watermark by digital halftone screening.

Referring to FIG. 5, according to the manufacturing method of the watermark in the embodiment of the present invention, the personalized pattern 3 is then printed onto the original paper by digital halftoning technique to form the watermark pattern that can appear after being copied. In this step, the digital halftoning technique is executed as shown in FIG. 5, so that the personalized pattern 3 is printed onto the original paper, e.g. a note book, a book, an identification card, a certificate, and other to-be-encrypted documents. In the step, two halftone patterns of AM and FM are denoted as G and G', respectively. If the hidden-pattern mask is denoted as W, the combined pattern M can be computed (black dot is 1, white dot is 0) by the following equation (5):

$$M=(G \cap W) \cup (G' \cap \sim W) \quad (5)$$

Wherein M represents the combined halftone pattern, W is a bi-level hidden-pattern mask X, .about. W is a background area of the mask X, G represents the pattern of amplitude modulation (AM) halftone dot sets, G' represents the pattern of frequency modulation (FM) halftone dots, .and gate. represents the logical operation of "AND", and .hoarfrost. represents the logical operation of "OR".

Referring to FIGS. 3 and 4, according to the manufacturing method of the watermark, the watermark pattern 3 can be computed and printed on a surface of an original paper (i.e. a printed paper). The watermark pattern 3 comprises a first region 31 and a second region 32, and the first region 31 and the second region 32 commonly form the personalized pattern. The first region 31 is formed by amplitude modulation (AM) halftone dot sets 21, and the arrangement of the AM halftone dot sets 21 is equidistant. The second region 32 is formed by frequency modulation (FM) halftone dots 22, and the arrangement of the FM halftone dots 22 is non-equidistant. Furthermore, each of the AM halftone dot sets 21 has a plurality of ink portions 211 and a plurality of blank portions 212, and each of the blank portions 212 is located between two of the adjacent ink portions 211 in the same AM halftone dot set 21. An ink area percentage of the first region 31 and an ink area percentage of the second region 32 are the same. The interval (i.e. first interval) of the blank portions 212 between any two of the adjacent ink portions 211 in each of the AM halftone dot sets 21 is smaller than the interval (i.e. second interval) between any two of the adjacent AM halftone dot sets 21. For example, the ratio of the first interval and the second interval is 1:10 to 1:20, but it is not limited thereto.

Figure 6:
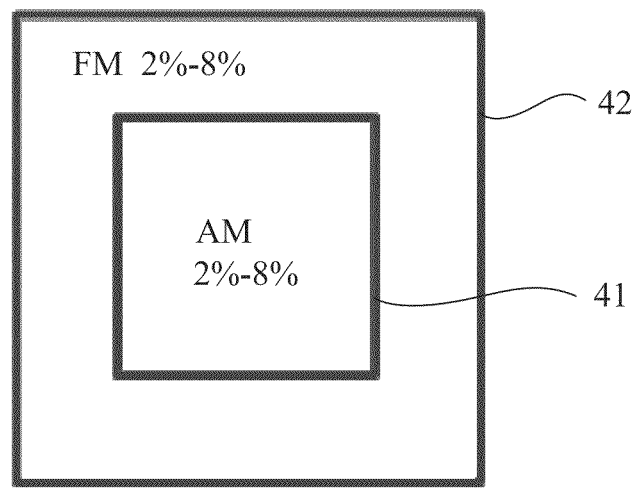
FIGS. 6 and 7 are schematic views of a density-calibration chart for a manufacture process of the watermark according to the preferred embodiment of the present invention.
Figure 7:
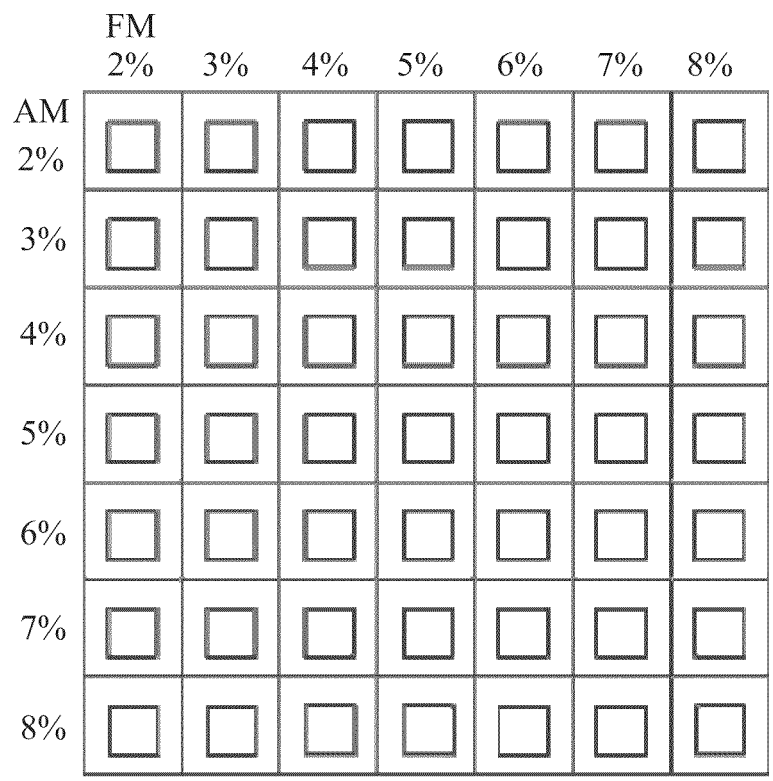

Referring to FIGS. 6 and 7, schematic views of density-calibration charts (i.e. density matching table) for a manufacture process of watermarks are illustrated, wherein FIG. 6 is a schematic view of a square-like density-calibration chart, in which a center block 41 is an area of AM halftone dots formed by 8×8 or other size threshold matrix, and an external block 42 is an area of FM halftone dots formed by halftoning technique. As shown in FIG. 7, the inking area percentage of the AM halftone dots and the FM halftone dots are set to be 2% to 8%, the matching of the ink density of the AM and FM halftone dots after printing can be observed.

Figure 8:
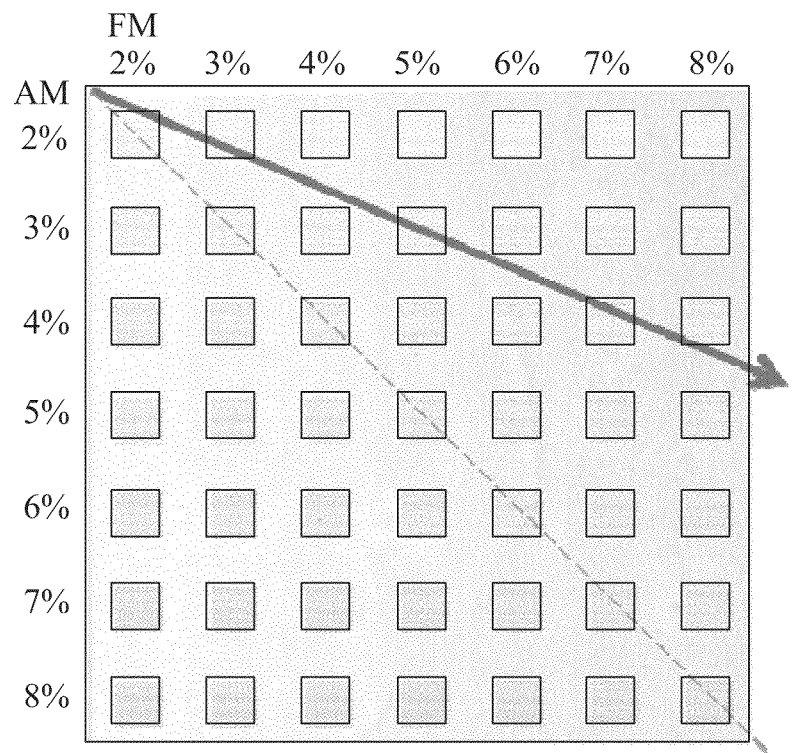
FIGS. 8 and 9 are schematic views of density-calibration charts for printing traditional watermarks onto two different papers.
Figure 9:
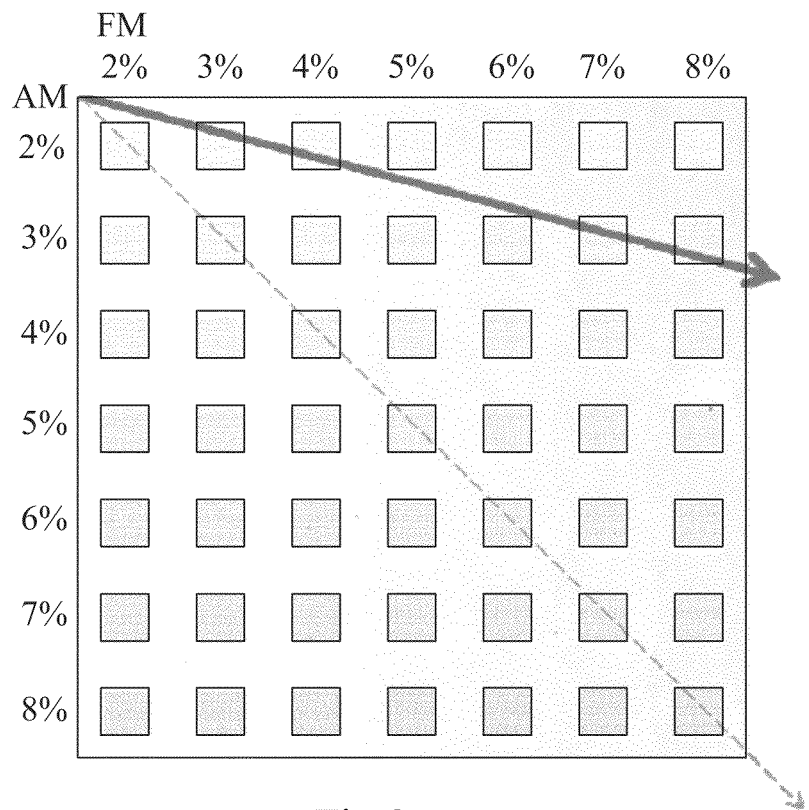

Referring to FIGS. 8 and 9, schematic views of density-calibration charts for printing traditional watermarks onto two different papers are illustrated, wherein due to dot loss and various dot gains caused during plate-making and printing, the area percentage of the FM halftone dots 12 must be adjusted to be higher than the area percentage of the AM halftone dots 11 to actually balance the density. Therefore, there is a difference between the value of the expectation (dotted line shown in FIGS. 8 and 9) and the value of experiment (solid line shown in FIGS. 8 and 9), and the difference shown in FIG. 9 (traditional watermark printed on a second type of paper) is larger than that shown in FIG. 8 (traditional watermark printed on a first type of paper). As a result, the hidden effect of the traditional watermark is unstable by printing onto different papers.

Figure 10:
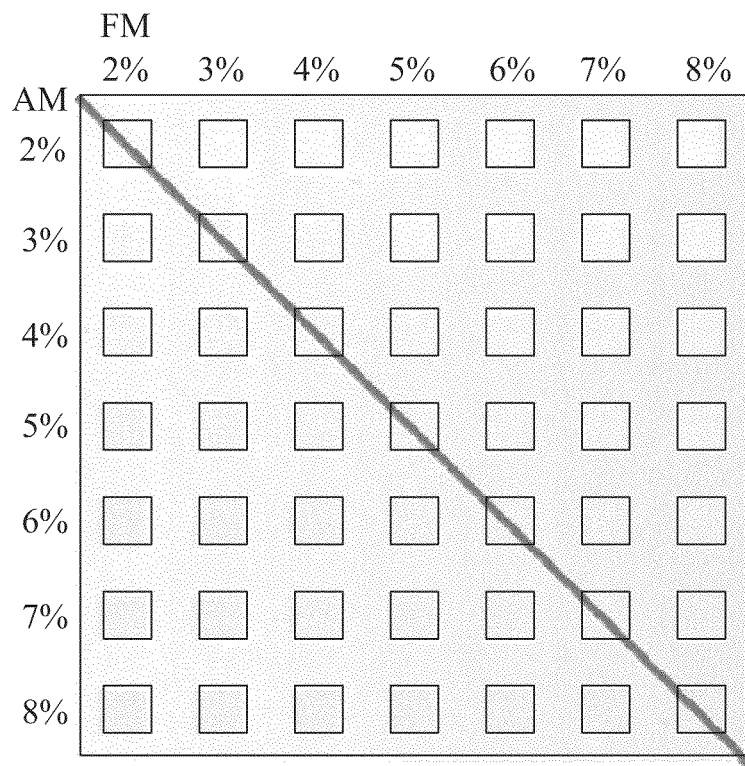
FIGS. 10 and 11 are schematic views of density-calibration charts for printing watermarks on two different papers according to the preferred embodiment of the present invention.
Figure 11:
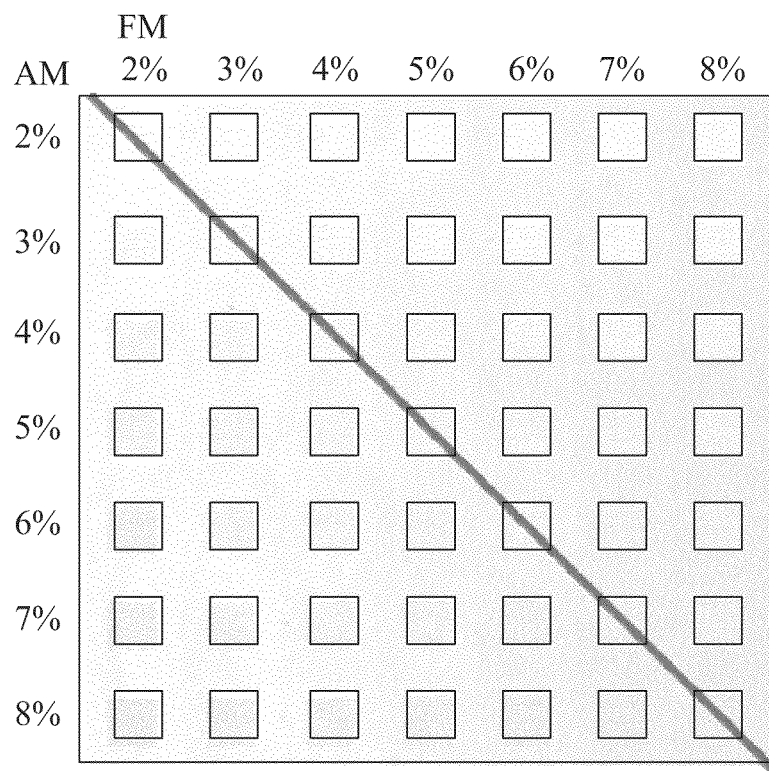
Figure 12:
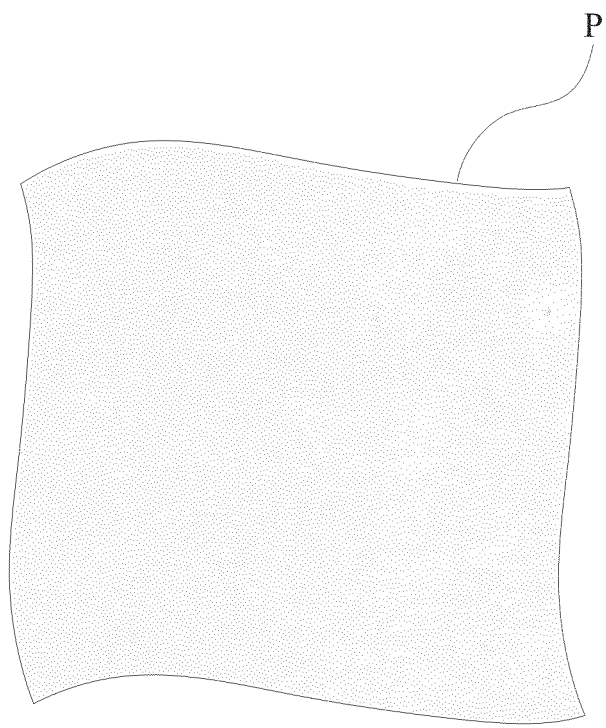
FIGS. 12 and 13 are schematic views of the watermark printed on the original anti-counterfeiting paper and the copy according to the preferred embodiment of the present invention.
Figure 13:
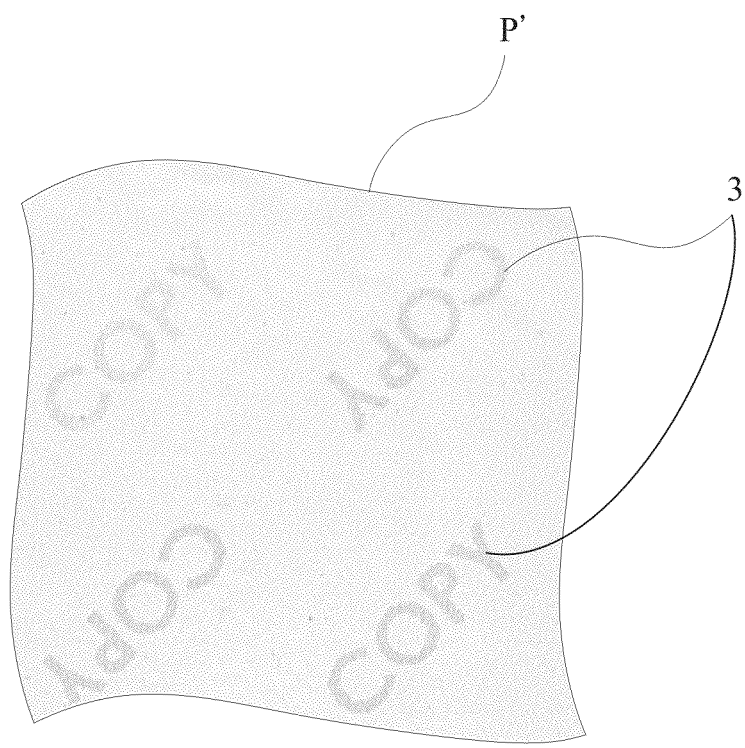

Referring to FIGS. 10 and 11, schematic views of density-calibration charts for printing watermarks on two different papers are illustrated, wherein the value of the expectation (dotted line shown in FIGS. 10 and 11) and the value of experiment (solid line shown in FIGS. 10 and 11) are overlapped and consistent, i.e. the AM halftone dot sets 21 and the FM halftone dots 22 having the same area percentage can be matched to each other to balance the density, and to further balance the dot gain of the AM halftone dot sets 21 and the FM halftone dots 22. Referring to FIGS. 12 and 13, schematic views of the watermark printed on the original anti-counterfeiting paper P and the copy P', the original paper P is made by the method of the preferred embodiment of the present invention, the copy P' is copied from the original paper P, and thus the watermark pattern 3 will appear on the copy P', the watermark pattern 3 can be displayed to show the copyright and prevent the illegal copy.

As described above, the ink concentration of AM halftone dot sets 21 are dispersed by filling the blank portions 212 into each of the AM halftone dot sets 21, so that the dot gain of the AM halftone dots dot sets 21 and the FM halftone dots 22 can be balanced, and thus the process of density calibration of the AM halftone dot sets 21 and the FM halftone dots 22 can be omitted. Furthermore, different material of paper can be printed with the hidden watermark pattern 3 by the method of the present invention, halftone dot loss or dot grain during plate-making and printing are improved by balancing the dot gains of the AM halftone dot sets 21 and FM halftone dots 22, and thus the quality of the watermark pattern 3 can be controlled.

The present invention has been described with a preferred embodiment thereof and it is understood that many changes and modifications to the described embodiment can be carried out without departing from the scope and the spirit of the invention that is intended to be limited only by the appended claims.

What is claimed is:
1. A manufacturing method for a watermark, comprising steps of:
providing a plurality of AM (amplitude modulations halftone dot sets equidistantly spaced apart from each other to form a first region of a personalized pattern, wherein at least one of the AM halftone dot sets has a plurality of adjacent ink portions within the same AM halftone dot set;

filling a plurality of blank portions for each of the AM halftone dot sets that has the adjacent ink portions within the same AM halftone dot set, wherein an equidistant blank portion is filled between two of the adjacent ink portions to make the ink portions be equidistantly spaced apart from each other and have an interval within the same AM halftone dot set smaller than an interval between any two of the adjacent AM halftone dot sets;

providing a plurality of FM (frequency modulations) halftone dots to form a second region of the personalized pattern; and printing the personalized pattern onto a paper by digital halftoning technique to form a watermark pattern that can appear after being copied.

2. The manufacturing method according to claim 1, wherein the first region is at least one pattern area of the personalized pattern, and the second region is at least one background area of the personalized pattern.

3. The manufacturing method according to claim 1, wherein an inking area percentage of the first region is 2% to 8%.

4. The manufacturing method according to claim 1, wherein an inking area percentage of the second region is 2% to 8%.

5. The manufacturing method according to claim 1, wherein an inking area percentage of the first region is the same as an inking area percentage of the second region.

6. The manufacturing method according to claim 1, wherein an interval between any two of the adjacent ink portions are the same in each of the amplitude modulation halftone dot sets.

* * * * *